Figure 1:
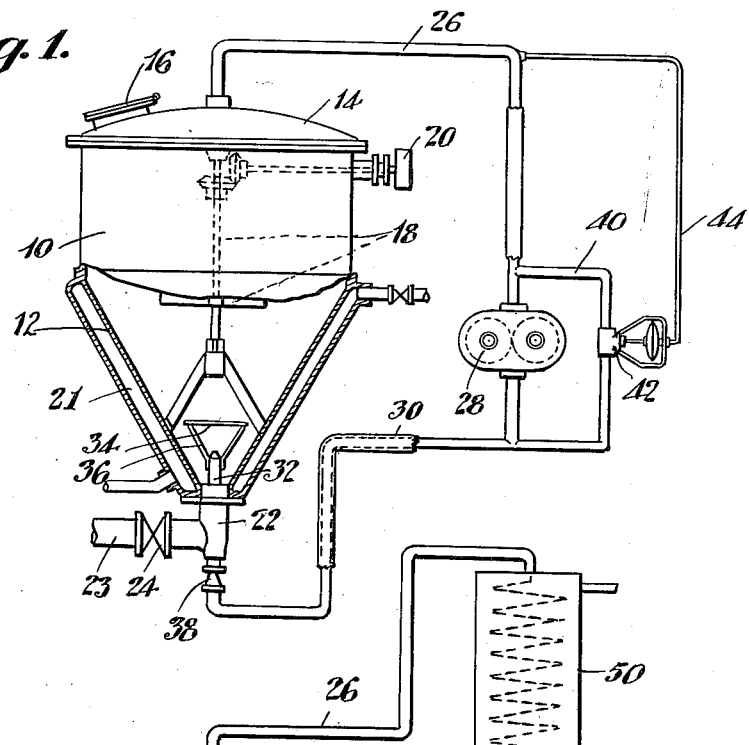

March 19, 1935.                A. JOHNSON ET AL                1,994,714
PRODUCTION OF SYNTHETIC RESINS
Filed May 23, 1931            2 Sheets-Sheet 1

INVENTORS
Alfred Johnson
Charles E. Howson
BY
Edmund G. Borden
ATTORNEY

March 19, 1935.　　A. JOHNSON ET AL　　1,994,714
PRODUCTION OF SYNTHETIC RESINS
Filed May 23, 1931　　2 Sheets-Sheet 2
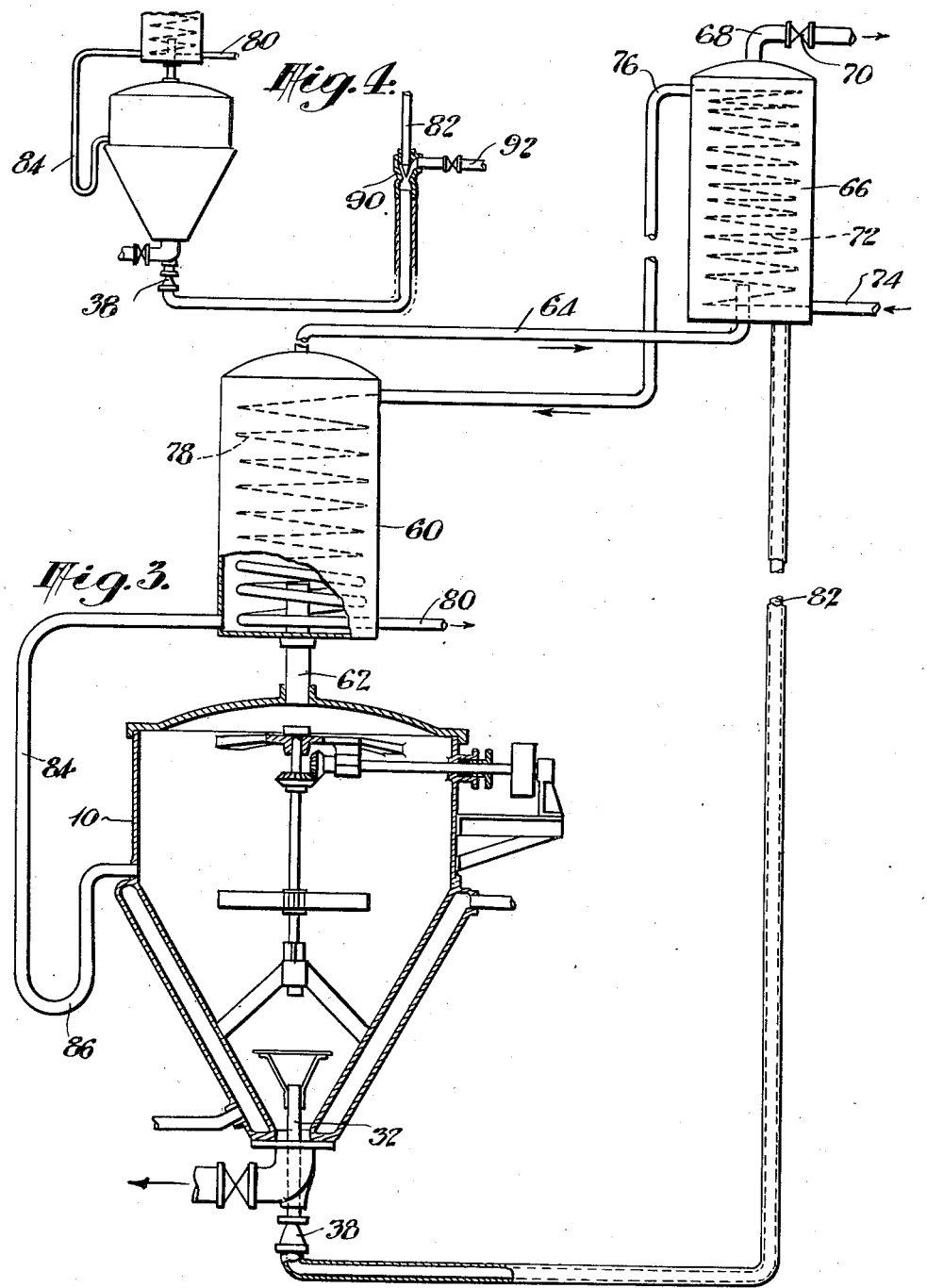
INVENTORS
Alfred Johnson
Charles E. Howson
BY
ATTORNEY Patented Mar. 19, 1935

1,994,714

UNITED STATES PATENT OFFICE 1,994,714

PRODUCTION OF SYNTHETIC RESINS

Alfred Johnson, West New Brighton, N. Y., and Charles E. Howson, Elizabeth, N. J., assignors to Combustion Utilities Corporation, New York, N. Y., a corporation of Maine Application May 23, 1931, Serial No. 539,492

3 Claims. (Cl. 260—4)

This invention relates to the production of synthetic resins, and more particularly it concerns a novel method for the control of conditions within a reaction kettle during resinification reactions for the production of synthetic resins. It is of wide application, but has especial utility in connection with the production of oil-soluble resins of the phenol formaldehyde type.

Several processes are already known for the production of synthetic resins suitable for use in the varnish and lacquer industries and which are entirely or largely soluble in the usual varnish oils such as linseed oil, Chinawood oil and the like. Certain of these processes involve the treatment of phenolic substances and derivatives with mixtures of active reagents which contain, in addition to formaldehyde, other aldehydes, solvents and substances having high vapor pressures at the temperatures reached in the resinification reaction. Such a process is exemplified in the co-pending application Serial No. 423,556 of M. R. Bhagwat, filed January 25, 1930, in which oil-soluble synthetic resins are produced by reactions involving the use of a mixture of formaldehyde and acetaldehyde, which may be in the form of a crude or refined reaction mixture produced by the partial oxidation of hydrocarbons in the vapor phase.

The resinification reaction in the Bhagwat and similar processes occurs at temperatures near the boiling point of the mixture of reactants,—generally in the neighborhood of from 85° to 100° C. In such processes the amount of acetaldehyde required must be maintained above a certain minimum amount throughout the treatment in order to insure the production of the oil-soluble type of resin. Acetaldehyde has a boiling point of 21° C., and consequently when the usual type of apparatus, provided with a reflux condenser connected with the reaction vessel, is employed in the resinification process, there result substantial though variable losses of the low-boiling constituents of the reaction mixture, which losses seriously interfere with the uniformity of the product. Moreover, the losses of low boiling acetaldehyde frequently cause the production of a rubbery oil-insoluble resinous product which has little if any commercial value.

It is possible to reduce in marked degree the extent of the reactive ingredients lost by volatilization, by increasing the size and improving the construction of the reflux condenser whereby a larger portion of the volatilized ingredients may be condensed and returned to the reaction vessel. However, any condensate thus returned to the reaction vessel, upon coming in contact with the upper surface of the liquid or with the highly heated vapors immediately thereabove, will promptly flash into vapor and therefore intimate contact thereof with the other liquid reactants in the body of the liquid is prevented, excepting at points closely adjacent the surface of the liquid.

A considerable portion of one or more of the reactants is thus maintained isolated in the vapor phase, which proportion is variable depending upon the reactants employed and the various conditions under which the resinification is carried out. Heretofore it has therefore been necessary to utilize an excess of the low boiling constituent over that taking active part in the reaction in order to insure the presence in the reaction mixture of a sufficient quantity of each constituent to prevent formation of worthless products.

The observation has now been made that this undesirable concentration of one or more reactants or other components in the vapor phase above the liquid reaction mixture and the loss of the low boiling ingredients through the condenser during resinification may be prevented and a process developed for the production of a uniform resin product under conditions making possible the utilization of the least possible amount of each ingredient. This is accomplished by insuring that the reactants, including those volatilized at the temperatures employed in the reaction, will be maintained practically continuously in intimate contact with each other within the body of the reaction mixture and in the form in which they are most effective for inter-action with each other for the production of the desired resins. After the resinification reaction is completed, the resinous mass is carefully heated for distilling or vaporizing the water and low-boiling ingredients in well known manner, such as that described in the above-mentioned Bhagwat patent application.

Among the more important objects of the present invention are: to provide in an improved manner for a highly efficient utilization of each of the reactants present in a resin-forming reaction mixture containing one or more low-boiling ingredients; to provide an improved process for the production of oil-soluble resins of uniform quality involving the use of a low-boiling constituent; to provide in a process for the production of oil-soluble resins for reducing or eliminating losses due to the formation of worthless rubbery products; to provide in a novel manner for preventing loss of valuable ingredients in the course of the production of synthetic resins; to provide an improved and accurate control of conditions within a reaction vessel during the resinification of liquid mixtures that include one or more low-boiling constituents.

In its broadest scope, the invention involves provisions for the continuous return to and intimate mixture with the body of reactants in the reaction vessel during the resinification reaction, of any of the ingredients of the reaction mixture which are volatilized during the said reaction. Stated in another manner, the invention involves the maintenance of the minimum concentration of reactive ingredients in the vapor phase above the body of reactants in the reaction vessel,—based upon the vapor pressures of the reactants and upon the particular conditions under which the reaction is being performed. The invention is applicable alike to resinification reactions carried out at atmopspheric pressure or therebelow; and to such reactions carried out under superatmospheric pressures such as those in present day use.

The various reacting ingredients, including any solvents such as methyl alcohol or other substances forming part of or present in the reaction mixture are placed in a closed pressure-tight reaction vessel in the usual manner, and the mixture is brought up to a suitable resinification temperature,—preferably near but below the boiling point of the mixture. Any low-boiling constituents will tend to volatilize and enter the vapor phase, where they are out of contact with the other reactants taking part in the resinification reaction. These vapors are withdrawn, preferably as rapidly as formed, and are thereafter conducted, either while still in vapor form or after condensation in well known manner, by means of a cooling fluid or refrigerant,—to the main body of the liquid, being introduced in the lower portion of the said body, generally through a spray nozzle or the like, whereby an intimate mixture thereof with the liquid body is effected.

Various types of circulating systems may be provided for conveying these vapors or the condensate therefrom to and introducing the same into the main body of the liquid. Where the vapors are condensed before return to the reaction vessel, either natural circulation or forced circulation by the use of a suitable pump or an injector functioning under the action of an inert gas may be used. Where the vapors themselves are recirculated, it is preferable to employ a force pump,—the operation of which may if desired be controlled by a thermostat placed in the vapor line leading from the reaction vessel, and which may be by-passed by a line having therein a pressure-controlled valve for use in connection with operations under pressure.

Figure 2:
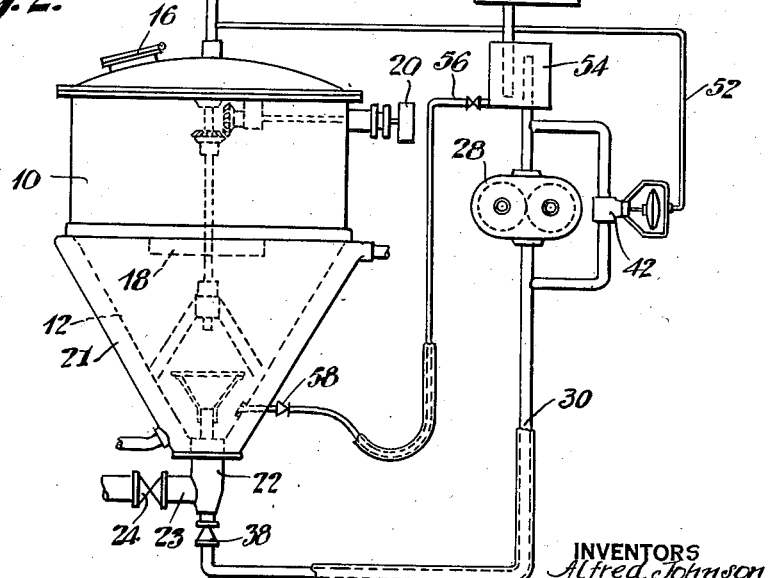

In the accompanying drawings exemplifying apparatus adapted for use with certain preferred modifications of the invention, Fig. 1 shows a reaction vessel and fluid circulation apparatus adapted for the circulation of vapors; Fig. 2 is a side elevation of a modified construction including apparatus adapted for condensing volatilized material and returning the condensate to the reaction vessel; Fig. 3 is an elevation, partly in section, of a modification involving the use of a refrigerant, and natural circulation of the volatilized ingredient; and Fig. 4 is a fragmentary view partly in section of a modified form of the apparatus of Fig. 3 in which fluid circulation is effected by means of an inert gas.

Referring to Fig. 1 of the drawings, numeral 10 is a reaction vessel provided with a conical-shaped bottom 12 and a top member 14 constructed in well known manner. An opening having a pressure tight cover 16 is provided for introducing the ingredients in the vessel 10. The reaction kettle is provided with apparatus 18 for agitating the contents of the kettle, which apparatus is driven by power applied to pulley member 20 connected through gearing to the shaft of the agitator in well known manner. The vessel 10 is provided with a steam jacket 21 which is provided with the usual inlet and outlet for the introduction and removal of steam or other heat-transferring fluid.

The kettle is provided with a central bottom outlet pipe 22 having a branch 23 provided with a valve 24, and leading to a point of discharge of the final product.

For removing the vaporized constituents of the reaction mixture from the vapor space of the reaction vessel and for introducing the same into the lower portion of the body of the liquid therein, there is provided a system which includes a conduit 26 having one end in communication with the inside of the reaction kettle adjacent the top 14. The other end of the conduit 26 is connected with the intake of a suitable pump 28, the discharge end of the latter being in communication through a conduit 30 with a fluid inlet conduit 32 which extends upwardly within the conduit 22 and into the lower portion of the reaction kettle. A baffle member 34 is provided immediately above the outlet of the discharge conduit 32 and is adapted to change the direction of the fluid entering the reaction kettle at this point for insuring agitation therewith of the reaction mixture in a manner to facilitate thorough intermingling of these fluids. The baffle 34 is shown as supported upon the conduit 32 by means of struts 36. Any other equivalent construction may be employed; the baffle may be supported from the wall of the vessel 10,—or a spray nozzle may be provided on the outlet end of conduit 32.

A return flow check valve 38 is provided in the conduit 30 at a point as close as possible to the reaction kettle; and the said valve is so adjusted as to prevent escape of liquid from the reaction kettle downwardly into the conduit 30.

For maintaining circulation conditions in the apparatus when for example employing superatmospheric pressures, there is provided a pressure control system which in the form shown includes a by-pass line 40 having its respective ends in communication with conduits 26 and 30. A pressure-controlled cut-off valve 42 is interposed in the conduit 40, this valve being of well known construction and adapted normally to be maintained in closed position by the action of a spring contained therein. A diaphragm connected with the valve stem is under the control of pressure transmitted thereto through a fluid line 44, one end of which is connected to conduit 26. The valve is so adjusted that upon a certain predetermined pressure being reached in conduit 26, the valve 42 opens to permit by-passing of the pump by this fluid under pressure. If desired, a hand-operated valve may be used in the by-pass line in place of the automatic valve 42 shown.

The modification shown in Fig. 2 is similar to that of Fig. 1, with the exception that a condenser 50 of well-known type is interposed in the vapor conduit 26 between the reaction vessel and the pump 28. The valve 42 is under the control of fluid pressure from a line 52, one end of which is connected to the conduit 26 between the reaction vessel and the said condenser.

A separator 54, such as the one shown in Fig. 2, may be interposed in the line 26 between the condenser and the pump in instances where it is desired to return condensate to the lower portion of the body of liquid in the reaction vessel independently of the pump 28. The condensate return line 56 provided for the purpose has a covering of heat insulating material and is of such height above the liquid level in the vessel 10 that a positive gravity flow of liquid to the vessel is normally effected. A liquid return check valve 58 in the return line 56 prevents back flow of liquid from the vessel 10. The vapors flow from the separator 54 through or around the pump 28, as previously described in the modification shown in Fig. 1.

Fig. 3 illustrates a modification of the invention in which gravity is employed in the circulation of the substances volatilized in the reaction vessel.

A primary condenser 60 is disposed above the reaction vessel 10 and is connected therewith through the vapor line 62. A vapor line 64 connects the upper end of the condenser 60 with the lower portion of a secondary condenser 66, the latter having a vapor outlet 68 leading from the opposite end thereof the vapor outlet 68 having therein a suitable check valve 70. The condenser 66 is provided with a cooling coil 72 having an inlet 74 and an outlet conduit 76, the latter leading to the upper end of a cooling coil 78 disposed within the primary condenser 60. The opposite end 80 of the coil 78 may be connected to the inlet end of a mechanical refrigeration system (not shown); the fluid leaving the outlet may be in communication with conduit 74; or the fluid leaving the outlet 80 may be led away to waste.

A condensate conduit 82 connects the secondary condenser 66 with the pipe 32 leading into the lower portion of the reaction vessel 10 through the check valve 38. Conduit 82 is lagged with suitable heat-insulating material to prevent heat flow to or from the liquid therein. A liquid return conduit 84 having a U-bend 86 therein connects the lower portion of the secondary condenser with the interior of reaction vessel 10.

Fig. 4 illustrates a modification of the invention in which vapor flowing from the reaction kettle or liquid condensate therefrom flowing from a condenser such as condenser 66 of Fig. 3 is inspirated into the lower part of the reaction kettle by means of an inert gas such as nitrogen or carbon dioxide flowing under controlled pressure through the inspirator 90 from a conduit 92.

An example of a reaction mixture adapted for use in connection with the present invention is one consisting of 150 grams of the mixed higher tar acids from a low temperature tar distillate having a boiling range up to 300° C., 92 grams of U. S. P. formalin, 3.2 grams of C. P. acetaldehyde, and 22 ccs. of a normal sodium hydroxide solution. This reaction mixture is heated to a temperature around 90° C., while the pump 28 functions to withdraw volatilized acetaldehyde together with some formalin and water vapor and return the same under a relatively low preselected pressure, preferably not above 5 pounds per square inch, to the reaction vessel, where the baffle facilitates an intimate inter-mixture thereof with the other reactants. This proceeds continuously during the resinification reaction and serves not only to hasten the completion of the reaction, but it facilitates the controlled production of a uniform resin product.

After completion of the reaction, the resinous reaction mixture is treated in the usual manner to distill off water and the volatilizable liquids not taking part in the reaction. Where these liquids contain valuable components,—such as alcohols which are present in the aldehyde-containing liquids produced in the partial oxidation of natural gas and other hydrocarbons,—these components may be recovered in suitable manner as by fractional distillation or fractional condensation. The distillation is preferably carried out in separate stills to which the mixture is conducted from the apparatus of the present invention, although this is not essential.

If it is desired to do so, the reaction may be carried out under superatmospheric pressure, the heating temperatures being raised accordingly; the pressure relief valve 42 being adjusted to permit by-passing of the pump upon the development of a predetermined superatmospheric pressure in the vapor line 26.

If for any reason it is desired to condense and remove all or a portion of any high boiling constituent from the vapors passing from the vessel 10,—the modification shown in Fig. 2 may be utilized in which the liquid condensed in condenser 50, is separated from the residual vaporous constituents in the separator 54. The condensate may then flow through conduit 56 directly to the body of liquid in vessel 10, the vaporous constituents passing to the pump 28.

When utilizing the apparatus shown in Fig. 3, the vapors rising from the reaction vessel 10 pass into condenser 60 which is cooled by the circulation therethrough of a fluid refrigerant which has already taken up heat in passing through the cooling coil in secondary condenser 66. In condenser 60, the higher boiling materials,—principally water with some formaldehyde dissolved therein,—are condensed and are then returned to the reaction vessel through the conduit 84. The remaining vaporous constituents flow through line 64 to the secondary condenser 66, the latter of which is maintained at a suitably low temperature by means of cooled brine or other refrigerant circulated therethrough, the conditions being such that the remaining low-boiling reactive ingredients are there condensed and thence flow through the heat-insulated conduit 82 into the lower part of the reaction vessel. The conduit 82 is of sufficient length to provide a pressure head adapted to overcome the resistance of check valve 38 and the back pressure of the liquid in vessel 10, and to produce a positive flow of condensate into the reaction vessel.

Where an inert gas or vapor is employed for effecting in positive manner the return of the condensate to the reaction vessel, the excess fluid thus continuously introduced into the system at the injector 90 is caused to escape from the upper portion of condenser 66 through the check valve 70, the latter being properly adjusted for maintaining the desired pressure within the vessel 10. In such instances, care is necessary that condenser 66 effectively condenses all of the active ingredients vaporized in the vessel 10. Alternatively, any small amounts of uncondensed reactant may be recovered by subsequent treatment of the gas flowing past the check valve 70. In this modification, the gas stream may be used for agitating the contents of vessel 10,—no mechanical equipment for the purpose being required.

By the practice of the present invention in the manner hereinbefore described, it is possible to produce a uniformly high-grade resin product, employing for the purpose the minimum amount of the low-boiling ingredient or ingredients which has been found to be necessary for the production of a resin of the desired characteristics. In the manufacture of oil-soluble resins employing mixtures of acetaldehyde and formaldehyde it is possible to use a minimum ratio of acetaldehyde to formaldehyde that has been found to give an oil-soluble resin, without fear of having the acetaldehyde so reduced by loss through the condenser as to cause the production of a rubbery, insoluble resin of little technical value. Furthermore, improved yields of oil-soluble resins of great stability are facilitated, due to the fact that the invention makes possible the use of the least ratio of acetaldehyde to formaldehyde that is adapted to produce the desired resin.

The invention is not limited to the treatment of reaction mixtures involving low-boiling reactive ingredients for the production of synthetic resins. It may be used in the processing of a resinous reaction mixture involving a low-boiling ingredient, the continued presence of which is desired for any purpose,—as for example, because of its solvent properties. An example of such process is that where methyl alcohol in certain proportions is desired in a resinous reaction mixture for the purpose of controlling the rising viscosity thereof as the reaction progresses, thus facilitating the ready withdrawal of the reaction mixture upon the completion of the reaction. Likewise the invention can be used with advantage in connection with resinification processes of the type set out in Patent 1,658,281 issued to Reinhard Beutner, in which the boiling temperature of the reaction mixture is relatively low, due to the presence of a substantial amount of volatile solvent, so that in previous practice a lower reaction temperature and a longer reaction time was necessitated. Using the principles of the present invention a maximum concentration of the more highly volatile ingredients of the liquid reaction mixture is maintained in the latter throughout the period of heat treatment.

The term "liquid body containing resin forming reactive ingredients" and similar terms as employed in the accompanying claims is intended to cover not only mixtures of ingredients adapted to produce synthetic resins of the phenol-formaldehyde type but, as well, other reaction mixtures which contain components of widely differing boiling points and which mixtures are adapted upon suitable heat treatment to produce synthetic resins,—such as ketone-aldehyde resins, urea-formaldehyde resins, furfural resins, and others made from reaction mixtures which contain one or more ingredients substantially more volatile than the other under the conditions employed during the resinification.

Although it is preferable to introduce the volatilized constituents into the lowermost part of the liquid in the reaction vessels, it is within the scope of the invention to introduce them, in either liquid or vapor form, into the liquid body at any point or points therein. Where the said constituents reenter the reaction vessel near the surface of the liquid therein it is desirable to agitate the mixture strongly in order to insure intimacy of contact of its components. Under such conditions the returned material should be in the liquid form as it enters the reaction mixture. This may be accomplished by suitably condensing and cooling the same, employing for the purpose, when desired, refrigerants having temperatures as low as 0° to —15° F. or lower.

By the term "high boiling ingredients" and similar expressions appearing in the specification and claims, it is intended to refer to components of the reaction mixture having boiling points substantially above the temperature at which the resinification reaction is carried out, and during which they are present. Likewise the expression "low boiling substances", and like expressions in the specification and claims are intended to describe substances present in the reaction mixture which have boiling points substantially below the temperature at which the resinification reaction is conducted.

The invention is susceptible of modification within the scope of the appended claims.

Having thus described the invention we claim:

1. The process of producing synthetic resins of the phenol-formaldehyde type, which comprises maintaining a liquid body of reactive resin-forming ingredients including high boiling tar acids, formaldehyde and acetaldehyde in a closed reaction vessel, heating the body of reactive constituents to an optimum reaction temperature which is higher than the boiling point of certain of said ingredients, continuously removing the resulting vapors from said vessel, condensing a portion of the removed vapors and returning all of the resulting condensate to the liquid body in said vessel, and independently reintroducing all of the reactive ingredients in the remaining vapors into the lower portion of the liquid body in said vessel under conditions adapted to thoroughly intermingle the same with the ingredients of the liquid body.

2. The process for the production of oil soluble resins of the phenol-formaldehyde type, which comprises maintaining in a closed reaction vessel a liquid body of reactive resin-forming ingredients including high boiling tar acids, formaldehyde and acetaldehyde, heating the said body to the desired reaction temperature which is above the boiling point of some of the ingredients of the liquid mixture thereby vaporizing a portion of such mixture, continuously removing the vaporized portion containing substantial amounts of acetaldehyde from the reaction vessel, and reinjecting all of the removed reactive ingredients into the lower portion of the liquid body under conditions adapted to thoroughly intermingle the same with the ingredients of the liquid body.

3. The method for the production of oil soluble synthetic resins of the phenol-formaldehyde type which comprises maintaining in a closed reaction vessel a liquid body of resin-forming reactive ingredients which includes high boiling tar acids, formaldehyde, and acetaldehyde, heating the said liquid body to a temperature not higher than its boiling point, removing from contact with the liquid body the vaporized portion thereof thus formed, condensing by means of a uniform low temperature refrigerant the said vaporized portion, and introducing all of the reactive condensed ingredients into the lower portion of the liquid body under conditions adapted to thoroughly intermingle the former with the liquid body.

ALFRED JOHNSON.
CHARLES E. HOWSON.